United States Patent [19]

Stine

[11] 4,303,823
[45] Dec. 1, 1981

[54] WELDING DEVICE

[75] Inventor: Robert E. Stine, Racine, Wis.

[73] Assignee: Modine Manufacturing Company, Racine, Wis.

[21] Appl. No.: 115,115

[22] Filed: Jan. 24, 1980

[51] Int. Cl.³ .............................................. B23K 9/12
[52] U.S. Cl. .................................... 219/75; 219/60.2; 219/121 R; 219/125.1
[58] Field of Search ................... 219/60.2, 125.1, 75, 219/121 R

[56] References Cited

U.S. PATENT DOCUMENTS

| | | | |
|---|---|---|---|
| 935,358 | 9/1909 | Davis | 219/121 R |
| 3,051,825 | 8/1962 | Rockafellow | 219/108 X |
| 3,114,830 | 12/1963 | Wotitzky | 219/60.2 |

*Primary Examiner*—Elliot A. Goldberg

*Attorney, Agent, or Firm*—Wegner, Stellman, McCord, Wood & Dalton

[57] ABSTRACT

A multiple electrode magnetic arc welder that has a plurality of electrodes arranged in a preselected pattern corresponding to the arrangement of the multiple welds to be made by these electrodes in sequence. Each of these electrodes is mounted for movement from a retracted inoperative position toward the respective work areas where the welding takes place and back to the retracted position. The electrodes are moved individually into close proximity welding position to its workpiece for welding the workpiece and then retracted to inoperative position with the means for retracting the electrodes comprising means for automatically de-energizing the retracted electrode. The disclosure also includes a supply of pressurized inert gas and a valve for bathing the electrode and the workpiece in this inert gas automatically during the welding operation when the above close proximity position is maintained.

2 Claims, 3 Drawing Figures

WELDING DEVICE

BACKGROUND OF THE INVENTION

It is common practice to weld and particularly arc weld parts of a metal structure together in a preselected pattern to produce a welded product. An example of this is in tube and header heat exchangers such as automotive radiators where the ends of spaced tubes are welded in certain instances to oppositely spaced header plates. An example of such a welded construction is shown in U.S. Pat. No. 4,159,034 assigned to the assignee hereof.

The present invention provides an apparatus for automatically magnetic arc welding metal pieces such as the ends of spaced tubes to tube receiving flanges in the header plate in preselected sequence and preselected pattern.

One of the features of this invention therefore is to provide such an arc welding apparatus.

Another feature of the invention is to provide such an apparatus which includes means for automatically bathing the electrode and the parts being welded in an inert non-oxidizing gas during the welding process.

Prior art patents discovered in a patentability search before preparing this application are U.S. Pat. Nos. 1,854,536; 1,949,251; 2,602,869; 2,743,342; 2,763,755; 2,803,739; 2,817,001; 2,845,523; 3,294,954; 3,519,785; 3,519,786; 3,560,701; 3,641,309 and 4,056,705. The most important patents of this group appear to be U.S. Pat. Nos. 2,817,001; 3,519,785 and 3,519,786.

DESCRIPTION OF THE PREFERRED EMBODIMENT

Figure 1:
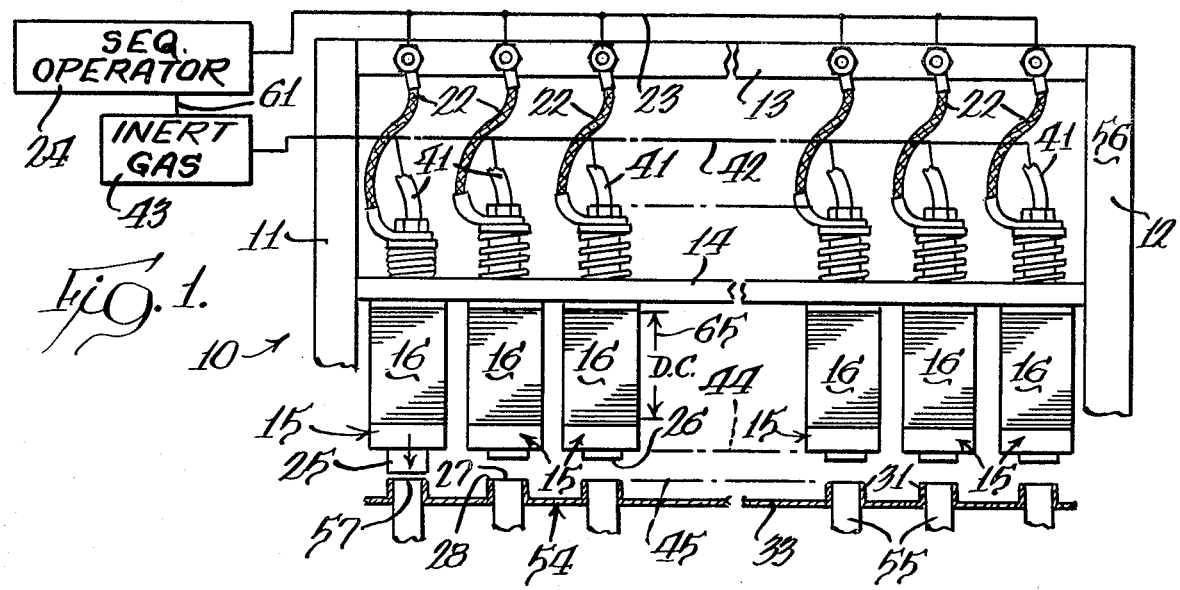
FIG. 1 is a partially schematic and partially broken away side elevational view of an apparatus embodying the invention.

The multiple electrode magnetic arc welder 10 comprises a frame 11 having vertical sides 12, horizontal top cross member 13 and a lower cross member 14 substantially parallel thereto.

Mounted on the lower cross member 14 are a plurality of electrode structures 15 each of which comprises an electric solenoid 16 arranged vertically and having in the axially central and vertical interior 17 a vertically slidable core 18. This core is slidable within the sleeve 21 that is bolted to the cross member 14 and which provides a spool for the wire solenoid 16.

The wire coils 16 of the solenoid structures 15 are electrically connected by insulated wiring 22 to an electric supply cable 23 leading from an electric sequential operator or energizer identified schematically in FIG. 1 at 24.

The core 18 of each electrode structure 15 has mounted on the lower end thereof an inverted cup-shaped electrode 25 that has a circular lower edge 26 spaced above the adjacent edges 27 and 28 of a header plate flange 31 and tube end 32, respectively. These flanges 31 are a part of a heat exchanger header plate 33 and the adjacent edges 27 and 28 comprise the workpiece for each electrode 25.

The insulated wiring or cable 22 is bolted to the top 34 of the core 18 by means of a nut 35 so as to provide electrical contact between the electrical supply 22-24 and the plurality of solenoid coils 16.

Each solenoid core 18 is provided with a hollow axial passage 36 therethrough terminating in branched exit ends 37 which diverge from each other in areas of the core 18 just above the electrode 25. When each core 18 is in retracted position as shown in FIG. 2 the surrounding sleeve 21 in which the electrode 18 is vertically slidable comprises a valve means for closing these exit ends 37.

The upper end of the axial passage 36 is connected to a coaxial passage 38 in the top member 34 to which the electrode cable 22 is attached as previously described and this passage 38 is connected to a flexible hose 41 all of which are connected to a manifold as indicated schematically at 42 so as to be supplied with an inert gas from an inert gas supply 43.

With the normal non-work space between the bottom edges 26 of the electrodes from the work area edges 27 and 28 comprising the workpieces the arc welding equipment is inoperative because of this spacing which is indicated by the distance between the parallel lines 44 and 45. When, however, the sequential operator 24 energizes the solenoid coils in preselected sequence the magnetic field of each solenoid indicated schematically in FIG. 3 at 67 urges the core 18 downwardly thereby providing the proper spacing 46 for creating the welding arc. As is well understood in electric arc welding the welding arc is established when the electrode 25 is moved to close proximity to the workpiece 47.

Figures 2, 3:
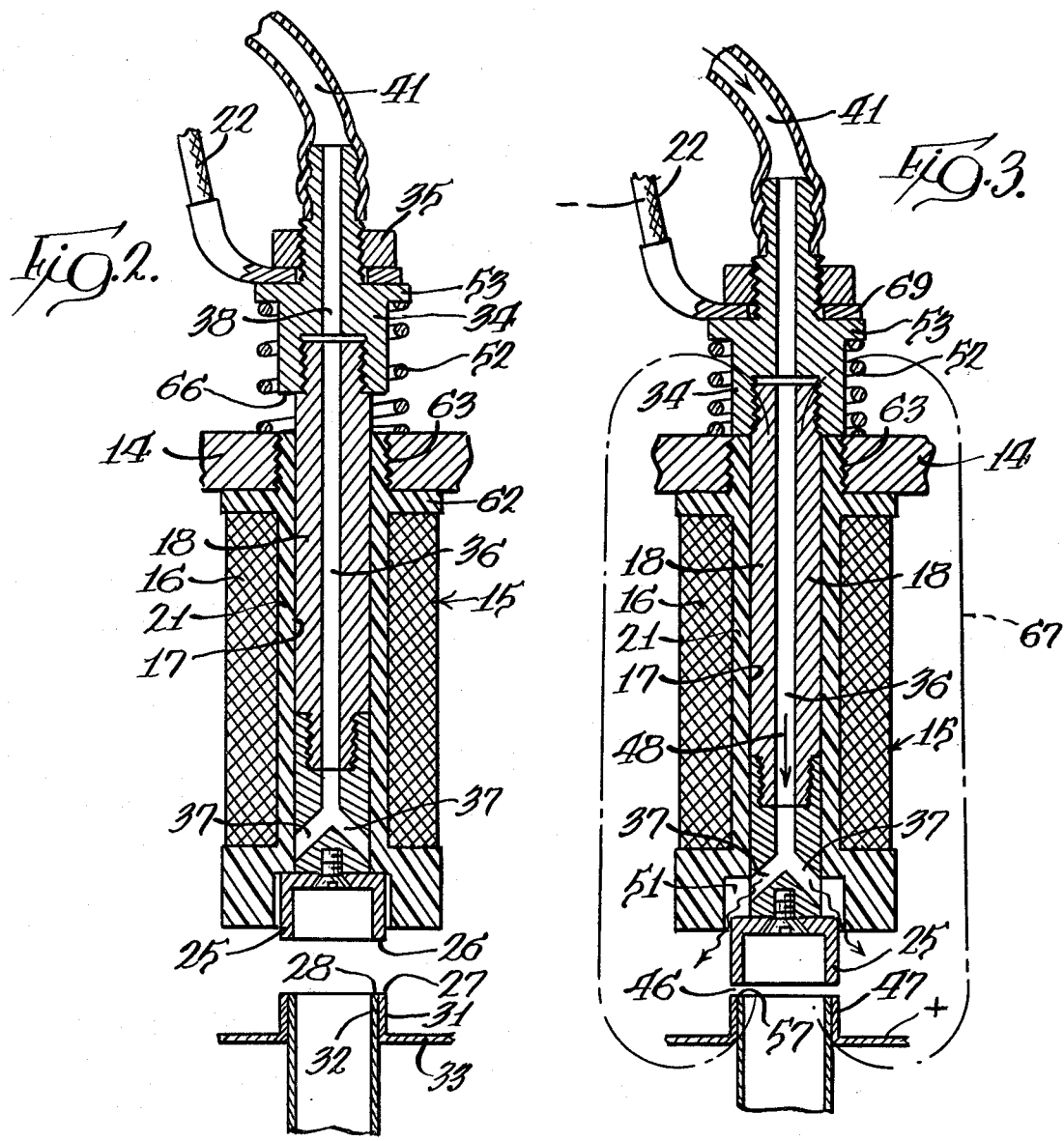
FIG. 2 is an enlarged vertical sectional view through an electrode and associated structure embodying the invention with the electrode being in retracted position.
FIG. 3 is a view similar to FIG. 2 but with the apparatus energized to show the electrode in projected position.

At the same time that the energizing of the solenoid coil 16 projects the electrode 25 core 18 into working position the movement of the core uncovers the exit ends 37 of the gas passages 36 and 38 to cause gas to flow as indicated by the arrow 58 out of the diverging exit ends 37 of the gas passage, into the area 51 into which the electrode 25 was received when in retracted position as shown in FIG. 2 and from there between this area the space 51 to surround the electrode 25 and workpiece 47 to prevent air oxidation of the molten weld metal as it is formed.

Then, upon de-energizing the solenoid coil 16 a coil spring 52 that extends between a circular flange 53 on the top member 34 and the top of the cross member 14 moves the core 18 upwardly to its retracted position of FIG. 2 thereby automatically de-energizing this particular solenoid and closing the gas exit passages 37.

The retraction of the core 18 first raises the electrode to inoperative position and then blocks the gas exits 37 to interrupt the gas supply.

As can be seen in FIG. 1, the welding electrode structure 15 is prepositioned to the same dimensions as the workpieces 47 to be welded. Thus in the illustrated embodiment the workpieces comprise the tube end edge 27 and the flange 31 edge 28 for the heat exchanger 54 of which only the header plate 33, tube receiving flanges 31 and tubes 55 are shown. The electrode structures 15 are positioned relative to the workpieces 47 in a single positioning arrangement as the electrode structures 15 are all mounted on the transverse lower cross member 14 of the supporting framework 56.

The operation of the welder is as follows. When a tube weld is to be made as illustrated by the weld 57 the solenoid 16 of the particular electrode is energized by way of its cable 22 and from the sequential operator 24. This projects the core 18 of the solenoid downwardly as illustrated to a space shown in FIG. 3 providing the welding gap 46. The dimensions of each of these gaps 46 is predetermined because the bottom of the member 53 which is attached to the core 18 then bears against the top surface of the frame cross member 14 which thereby acts as a stop.

This lowering of the solenoid core from the elevated position of FIG. 2 to the operating position of FIG. 3 opens the exit ends or ports 37 of the gas passage 35 and permits a flow of inert gas 48 from the inert gas supply 43. This inert gas flow 58 which is a non-oxidizing gas such as nitrogen protects the weld 57 before and during its formation from being oxidized by surrounding air.

After a short period of time which is necessary to sweep away the ambient air high frequency welding voltage is applied by way of the sequential operator 24. Because the one electrode only (the one at the extreme left in FIG. 1) is the only one in position for welding operation with the narrow gap 46 high frequency current jumps this gap 46 from the electrode 25 to the workpiece 47 to create a high metal melting temperature which forms the weld 57 in the customary manner.

After this is completed the operator 24 breaks the circuit to the solenoid coil 16 by way of the operator 24 and after this is done the inert gas supply 41-42 is interrupted. Then, another electrode 25 in the plurality of electrode structures 15 is projected into operating position in the same manner and the next joint is formed. This interrelationship of the electric supply 22-24 and the gas supply 41 and 42 is indicated schematically in FIG. 1 at 61.

A very great advantage of this invention is that there is only one welding circuit as indicated by the electric supply cable 22.

In the individual electrode structure 15 the coil 16 is wound on a spool 62 in the usual manner and this assembly is rigidly mounted on the support member 14 by screw thread engagement as illustrated at 63.

The core 18 that is movable as an armature when the coil 16 is electrically energized in the customary manner not only has the electrode proper 25 at its lower end but also has in it the inert gas passages 36 and 37, provides part of the electrical circuit to the electrode 25 by way of the cable 22 and carries the top member 34 which serves as a stop to limit the projected position of the electrode 25 and also has a support for the return coil spring 52. In addition, both the electrical connections 69 and the inert gas connection 41 are made through this top member 34.

As is customary, the solenoid is energized by applying a DC potential indicated at 65 to the ends of the respective coil 16 in the manner indicated schematically in FIG. 1. This potential is applied in such a direction as to cause the core 18 or plunger assembly to be projected downwardly to provide the welding gap 46 which is determined by the bottom 66 of the top member 34 engaging the top surface of the support cross member 13.

Also, as is customary, the welding current supplied to each electrode through the insulated wiring 22 is a high frequency, pulsing DC potential. This is a combination of high frequency AC and low voltage DC. As is true in arc welding generally, an arc or stream of electrons flows from the electrode 25 to the workpiece 57 as a result of the close spacing 46 as shown in FIG. 3 causing the weld area to be heated to the welding temperature.

While the arc is flowing it is acted upon by the magnetic field of the solenoid coil 16 which is shown schematically as lines of force 67. These push the welding arc in a circular pattern, in the illustrated embodiment, around the circular weld area 27-28.

When the current to the solenoid coil 16 is broken in the manner described, the return spring 52 automatically raises the electrode 25 from the operating position of FIG. 3 to the non-operating position of FIG. 2.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A multiple electrode magnetic arc welder, comprising:

a plurality of electrodes arranged in a preselected pattern corresponding to the arrangement of the welds to be made by said electrodes; means mounting said electrodes for movement from a retracted inoperative position toward the respective work areas where the welding takes place and back to said retracted position; means for moving each electrode in a preselected sequence into close proximity welding position to its workpiece for welding the workpiece, said means for moving each said electrode comprising a solenoid for each electrode including a core on which a said electrode is mounted, the solenoid thereby comprising means when energized for projecting said electrode into working position relative to its workpiece; means for automatically retracting said electrode to said inoperative position upon de-energizing of said solenoid comprising spring means constantly urging said electrode to said inoperative position; means for automatically projecting an inert pressurized gas substantially completely enveloping the electrode and workpiece adjacent to the electrode upon said moving of the electrode into operative position comprising gas passage means for said gas having a passage exit adjacent to said workpiece; and means on said electrode closing said passage exit when said electrode is in said retracted inoperative position and opening said exit when in said operative position, said means for retracting comprising means for automatically de-energizing the individual electrodes.

2. The welder of claim 1 wherein each said solenoid surrounds a said electrode and, when energized, projects its electrode as a core into working position and, at the same time, provides a supply of pressurized protective inert gas enveloping the electrode and its workpiece in working posigion, each said solenoid, when de-energized, permitting said retraction of each electrode to nonworking position and de-energizing of the gas supply.

* * * * *